R. MOODIE.
APPARATUS FOR GRADING GRANULAR SUBSTANCES.
APPLICATION FILED FEB. 25, 1908.

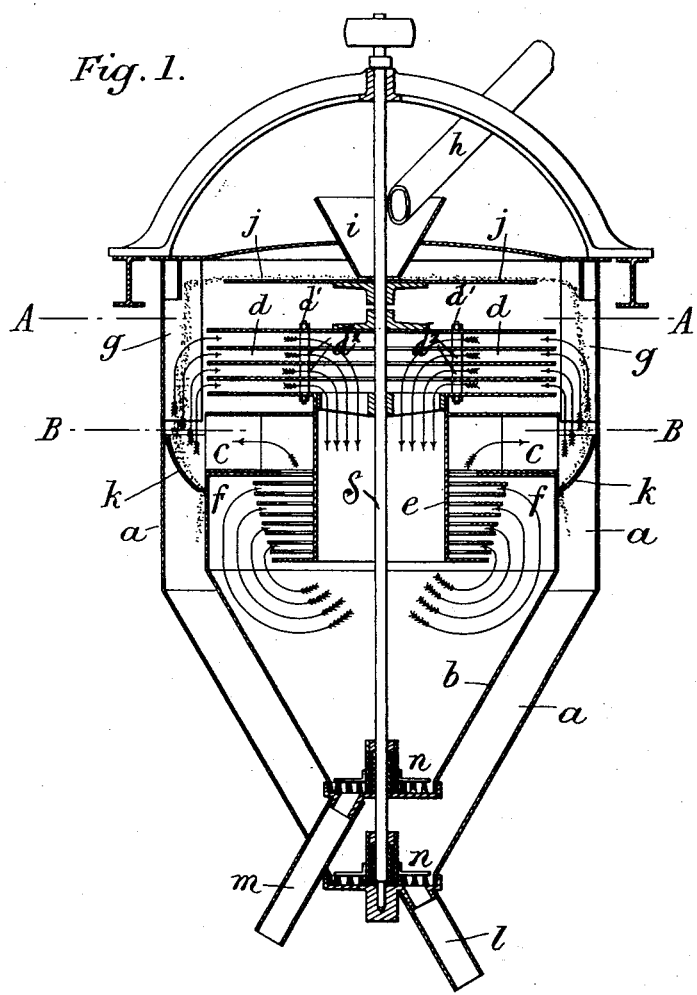
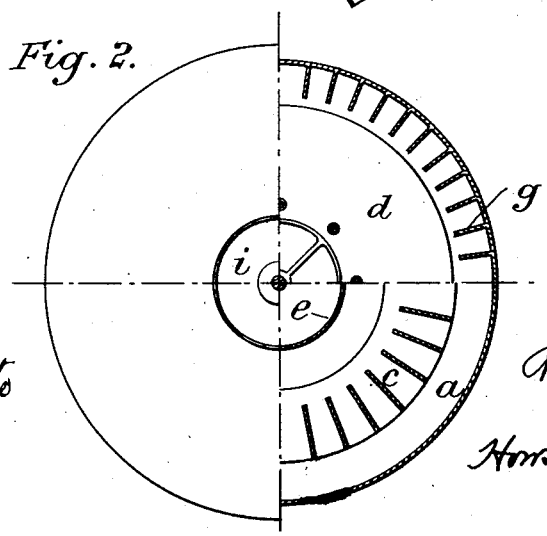

919,291.

Patented Apr. 20, 1909.

WITNESSES
L. H. Grote
M. E. Keir

INVENTOR
Robert Moodie
BY
Howson and Howson
ATTORNEYS

UNITED STATES PATENT OFFICE.

ROBERT MOODIE, OF GOODMAYES, ENGLAND.

APPARATUS FOR GRADING GRANULAR SUBSTANCES.

No. 919,291.  Specification of Letters Patent.  Patented April 20, 1909.

Application filed February 25, 1908. Serial No. 417,763.

*To all whom it may concern:*

Be it known that I, ROBERT MOODIE, a subject of the King of Great Britain and Ireland, of 65 Eastwood road, Goodmayes, in the county of Essex, England, have invented new and useful Apparatus for Grading Granular Substances, of which the following is a specification.

This invention relates to apparatus especially intended for separating, or grading, substances of different sizes, or specific gravities, such as ground, or crushed, grain, minerals, and the like, but it may be used also for separating dust from air. For the purpose of description I will presume it is to be employed for separating, or grading, granular substances. It has an outer chamber and an inner chamber for the reception of the coarse and fine particles respectively and a fan rotating on a vertical axis. The material to be graded, or separated, is fed into the upper part of the outer chamber. Between the said chambers are revolving disks with spaces between them, communicating with the outer chamber, an opening in the center of the disks giving communication with the inner chamber to receive the fine portions. The said disks are preferably above the fan which causes air to pass from the outer chamber inward between the disks and into the inner chamber.

Figure 4:
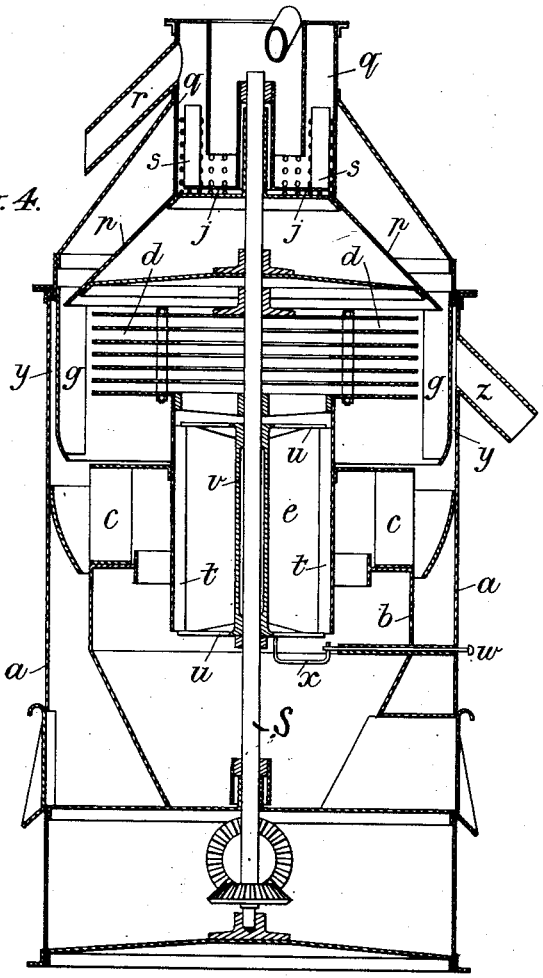
Figure 5:
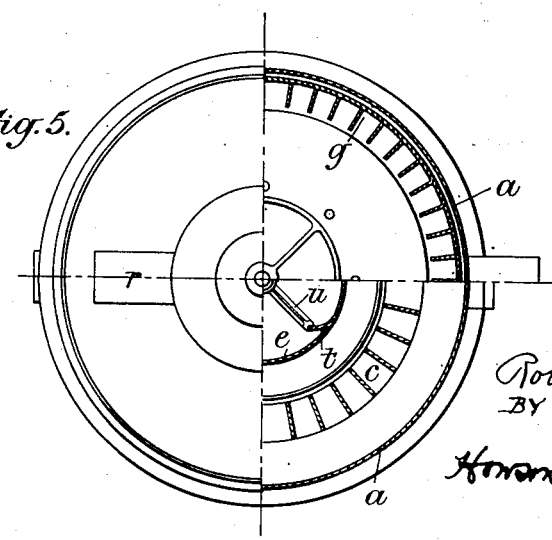

Referring to the accompanying drawings, Figures 1 and 2 respectively show a vertical section and a plan, half in cross section, (the upper part of the section being taken on the line B and the lower part on the line A Fig. 1), of a constructional form of apparatus in accordance with my invention. Fig. 3 is a horizontal broken section showing the guide blades $g$; and Figs. 4 and 5 are views corresponding to Figs. 1 and 2 respectively, of a modified construction of the apparatus.

$a$ is the outer chamber, or casing, to which the granular material is supplied and wherein the separation of the fine particles from the coarse particles takes place and into the lower part of which the coarse particles descend and from which they are removed.

$b$ is the inner chamber where the fine particles are separated from the air and are deposited and from which they are removed.

$c$ is the fan for circulating the air which is used over and over again, the said fan being fixed to a vertical shaft $S$ mounted in bearings as shown and provided with means for driving it from any suitable source of power.

$d$ are the disks for separating the fine particles from the coarse particles. The upper disk is connected to the fan shaft and the other disks are connected to the upper disk by bolts $d^1$ with distance pieces $d^2$ as shown.

$e$ is an inner tube, or cylinder, connected to, and rotating with, the disks $d$ and fan $c$.

$f$ are disks which are attached to, and rotate with, the cylinder $e$ and have openings through which the air returns to the fan chamber.

$g$ are stationary guide-plates, or baffles, fixed to the casing $a$ (or suspended from the cover) opposite the disks $d$ to direct air from the fan $c$ to between the disks $d$.

The granular material to be separated, or graded, is fed by the pipe $h$ into the central hopper, or funnel, $i$ at the top and falls onto the distributing disk $j$ fixed to the fan shaft and is thrown by centrifugal force outward all round and descends between the guide-plates, or baffles, $g$ in vertical streams opposite the outer edge of the revolving disks $d$. An upward current of air from the fan $c$ meets the descending streams of materials and lifts the lighter, or smaller, particles which are drawn toward the center through the disks $d$ by the current of air and are rejected by the said disks $d$ if too large, or too heavy, and fall with the coarse particles onto the curved plate $k$ and into the lower part of the outer casing $a$. The fine particles which have passed through the spaces between the disks $d$ are carried to the center with the air, some of such particles being deposited on the inner surface of the revolving tube, or cylinder, $e$, where it may be allowed to accumulate and fall off, or may be scraped, or brushed, off while running. A further separation of the fine particles, or dust, from the air may be accomplished by the whirling inside the casing $b$ and still further by the disks $f$ at the point of return of the air to the fan $c$. The arrows denote the direction of the air-currents.

$l$ is the outlet for coarse particles and $m$ is the outlet for fine particles.

$n$ are brushes fixed to the fan shaft to brush the material into the said outlets.

Figs. 4 and 5 show, in views similar to Figs. 1 and 2, another constructional form of the apparatus including means for feeding the apparatus to insure that the material will approach the points of separation at a constant, or uniform, velocity, for which purpose the said material is caused to trickle down an incline constituted by the cone $p$ from the periphery of which they fall round the circumference among the guides $g$. For some materials, such as crushed grain, and the like, it is desirable to take the coarsest particles out before the material passes into the lower part of the separator. For this purpose a cylinder $q$ surrounds the feed disk $j$, the upper part of this cylinder $q$ being plain and provided with an outlet $r$ and the lower part being perforated. On the disk $j$ are two, or more, vertical projections, or blades, $s$ shaped so as to toss the material upward and also against the perforated part of the cylinder $q$, the finer particles passing through the said perforated part to the feed cone $p$ and the coarser particles being projected upward and caused to overflow through the spout $r$. This apparatus is shown as being provided with an arrangement for scraping from the interior of the pipe, or cylinder, $e$ the material deposited thereon. Vertical swiveling blades, or scrapers, $t$ are supported on arms $u$ carried by a light tube $v$ mounted on the shaft S of the fan and these are, by centrifugal force, kept in contact with the interior of the pipe, or cylinder, $e$ and revolve with it. When it is required to dislodge the accumulated material, the rod $w$ is thrust into contact with the stop $x$ on one of the arms $u$ thus arresting the blades, or scrapers, $t$. Heavy dust falls of itself, or when the speed is slackened. In this arrangement an annular space $y$ is shown between the casing $a$ and the part carrying the guide-blades $g$ so that a portion of the coarse particles may be spun round and upward by the current from the fan and discharged at $z$. The guide-blades $g$ may be of various forms to suit the various materials.

Fig. 3 shows a suitable form for certain materials. By altering the width of the spaces between the disks $d$, or by varying the force of the blast, or air-current, or by both means combined, the produce may be finer, or coarser, as desired. The spaces between the disks may be altered by any suitable means as for instance by putting longer, or shorter, distance pieces between them.

The depositing chambers $a$ and $b$ may be conical at the bottom for self-delivery, as in Figs. 1 and 2, or they may be flat at the bottom, as in Figs. 4 and 5, and be taken out at intervals, or discharged in any convenient manner. In the arrangement Figs. 4 and 5 the disks $f$ (shown in Fig. 1), are not shown as being used and the fan $c$ is shown as being driven from below instead of from above.

I do not bind myself to the exact details of the drawings, or methods, described in carrying my invention into effect, as they may be varied to suit various conditions, or materials.

I claim—

1. In a separator or grader, a casing, a centrifugal disk rotatable within said casing and provided with a central passage, means for directing an air current upwardly outside of said disk across the face of the latter and down through said central passage in combination with means for feeding the material to be separated to said upwardly directed air current whereby the heavier particles descend against the action of said air current and only the higher particles are carried to the centrifugal member thereby.

2. In a separator or grader, a casing, a centrifugal disk rotatable within said casing and provided with a central passage, means for circulating the air within the casing upwardly outside of said disk, across the same, down through said central opening and upward again in continuous circuit, in combination with means for feeding the material to be separated to said upwardly directed air current whereby the heavier particles descend against the action of said air current and only the higher particles are carried to the centrifugal member thereby.

3. In a separator or grader, a fan, a hollow cylindrical carrier therefor, and means to rotate the same in combination with a revolving disk arranged above said fan and provided with a central passage opening to the interior of said cylindrical carrier, and means for directing the air current from the fan across said disk, through said carrier and back to the fan again, substantially as described.

4. In a separator or grader, a casing, a centrifugal disk rotatable within said casing and provided with a central passage, means for directing an air current upwardly outside of said disk across the face of the latter and down through said central passage in combination with guides to direct the air current to said disk and means for feeding the material to be separated to said upwardly directed air current whereby the heavier particles descend against the action of said air current and only the lighter particles are carried to the centrifugal member thereby.

5. In a separator or grader, a fan, a hollow carrier therefor and means to rotate the same, in combination with a revolving disk provided with a central passage opening to the interior of said hollow carrier through which an air current is forced by said fan, together with a supplemental disk having a central opening mounted on said carrier, said air current being directed inwardly across said supplemental disk and through said perforation to the fan.

6. In a separator or grader, an outer chamber and an inner chamber, a plurality of horizontally arranged centrifugal disks spaced apart and provided with central openings forming a passage from the outer to the inner chamber, in combination with means for feeding the material to be sifted to said outer chamber and means for driving an air current upward against the streams of falling material in the outer chamber inwardly across the centrifugal disks through the interstices separating the same and down through the central openings therein to the inner chamber, substantially as described.

7. In a separator or grader, an outer chamber for heavier particles and an inner chamber for lighter particles, a series of horizontal centrifugal disks spaced apart and provided with central openings forming a passageway between said inner and outer chambers, means for forcing an air current from the outer chamber inwardly across the face of said disks and through said central openings to the inner chamber and means to feed the material to be separated to said air current outside the periphery of the disks whereby only the lighter particles are taken up and carried to said disks by the air current, substantially as described.

In testimony whereof I have signed my name to this specification in the presence of two subscribing witnesses.

ROBERT MOODIE.

Witnesses:
  H. D. JAMESON,
  CHARLES WILLIAM CROCKER.